UNITED STATES PATENT OFFICE.

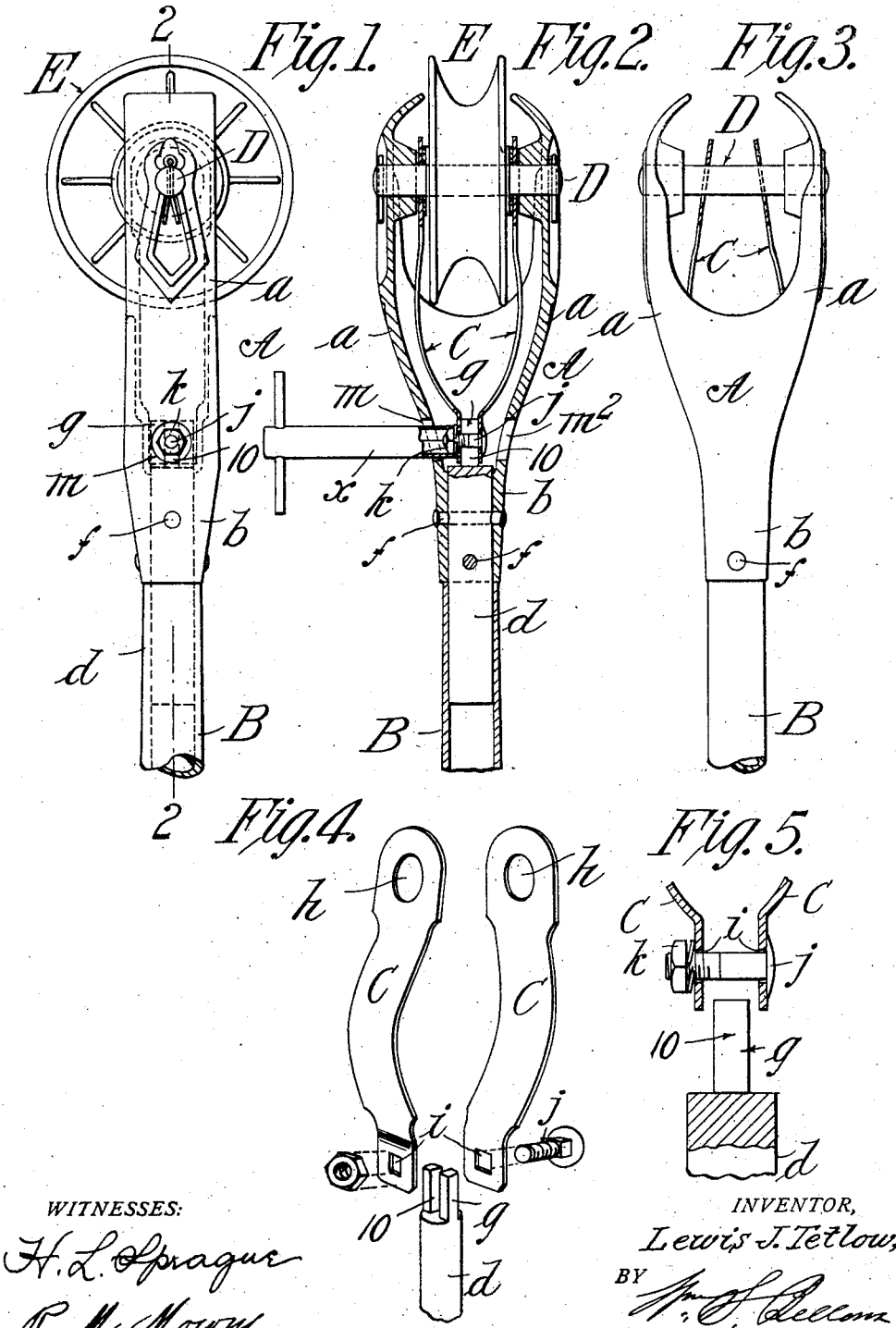

LEWIS J. TETLOW, OF HOLYOKE, MASSACHUSETTS, ASSIGNOR TO NEW ENGLAND TROLLEY WHEEL COMPANY, OF HOLYOKE, MASSACHUSETTS, A CORPORATION OF MASSACHUSETTS.

TROLLEY-HARP.

No. 919,263.　　　　Specification of Letters Patent.　　　Patented April 20, 1909.

Application filed November 14, 1908. Serial No. 462,733.

*To all whom it may concern:*

Be it known that I, LEWIS J. TETLOW, a citizen of the United States of America, and resident of Holyoke, in the county of Hampden and State of Massachusetts, have invented certain new and useful Improvements in Trolley-Harps, of which the following is a full, clear, and exact description.

This invention relates to improved means comprised in trolley harps or forks for the confinement therein of the contact spring or springs which assure current conveying connections between the trolley pole and the trolley wheel which is rotatably mounted on an axle or stud carried by the jaws of the harp.

The principal object of the invention is to provide means for the engagement of the spring or springs in the harp, in its proper relation whereby they may be most easily and quickly put in place or removed for substitution of new springs when occasion therefor arises,—obviating the necessity of the employment of rivets with the attendant delays and inconvenience.

Another object is to assure a most direct connection through the medium of the contact springs from the stem or shank of the harp, which is carried by the trolley pole, to the trolley wheel.

The invention consists in a trolley harp having provisions as hereinafter described; and furthermore in the combination or arrangement of parts and the construction of certain of the parts all substantially as hereinafter described in conjunction with the accompanying drawings, and set forth in the claims.

In the drawings:—Figure 1 is a side view of the trolley harp; Fig. 2 is a central vertical sectional view therethrough as taken on line 2—2, Fig. 1. Fig. 3 is an elevation as seen at right angles to Fig. 1,—the trolley wheel being absent; Fig. 4 is a perspective view showing particular formations of the springs and the upper extremity of the shank or stem of the harp and also showing the clamping bolt and nut,—all in separated relation. Fig. 5 is a partial sectional view for showing the relations of the springs and clamping bolt and nut preparatory to being confined in the harp.

Similar characters of reference indicate corresponding parts in all of the views.

In the drawings,—A represents the harp comprising the opposite jaws $a$ $a$ as usual but in the present case united by the base portion $b$ which is tubular and has the stem or shank $d$; by which the harp is carried at the upper end of the trolley pole B, fitted through such tubular shank and secured in any suitable manner as by rivets $f$; and the upper extremity $g$ of the stem or shank $d$ which is of reduced thickness as particularly shown in Figs. 4 and 5, and protrudes upwardly beyond and within the base of the harp, is constructed with a slot 10 opening to its upper end.

C C represent the pair of contact springs having apertures $h$ at their upper extremities as usual for the accommodation therethrough of the pin or axle D on which the trolley wheel E is mounted,—the springs having facewise bearings against the end of the trolley wheel hub or against interposed thin metallic washers. The contact springs have apertures $i$ in their lower extremities; and $j$ represents a headed bolt the shank of which engages through the apertures in the springs with its head outside of and against one of the springs while its shank extends through and beyond the aperture in the opposite and suitably separated spring and being screw threaded receives the engagement thereon of the clamping nut $k$.

One of the jaws of the harp has an opening $m$ therethrough opposite the upstanding slotted member $g$; and it is usually deemed advantageous to provide a like aperture $m^2$ in corresponding location through the opposite jaw. Preparatory to inserting the springs and confining them in the harp, the trolley wheel and axle being out of the harp, the springs are brought to opposition, the headed bolt $j$ engaged therethrough and the nut $k$ screwed more or less onto the extremity of the bolt, but so as to leave the springs separated by a distance somewhat greater than the width or transverse dimension of the slotted upstanding member $g$, and all as apparent from Fig. 5. The springs having their lower extremities shackled as above may be inserted between the jaws of the harp,—the middle portion of the bolt passing down into the slot 10 in the upstanding member $g$, any degree of vertical adjustment of the springs which may be desired being permissible and then the nut is turned up on the extremity of the bolt through means of a socket wrench $x$, shown in Fig. 2, the working end of which may be inserted for engagement with the nut through the aperture m, with the result of firmly and reliably bringing the springs to facewise contact against the opposite sides of the upstanding member g, and holding them there with a clamping bind. The turning movement of the nut relatively to the bolt, with no liability of a concurrent turning of the bolt is assured by the engagement of the polygonal shape portion of the bolt lying next to its head through the correspondingly shaped hole in the spring. After the springs have been brought to the relations to the upstanding slotted part g within the base of the harp above stated, the trolley wheel may be put into the harp and the axle pin inserted and secured; and as above intimated the springs are capable of being vertically adjusted so that the walls of the apertures h h in the springs (through which apertures the axle passes) will not touch the axle circumferentially, the avoidance of which is considered desirable in trolleys.

The manner of removal of the contact springs from the harp, and the ease and quickness with which it may be done, for replacement by new springs, are apparent, as is also the fact that the current conveyed to the pole will, by passing through the stem d to the springs have the most direct course.

I claim:—

1. A trolley harp having at its base between and in separation from, its jaws an upstanding member provided with a slot opening to its upper end, and one of the jaws opposite said upstanding slotted member having an aperture therethrough.

2. A trolley harp comprising opposed jaws and a uniting tubular base portion, a stem fitted through and secured within the said tubular base portion and having its upper extremity of reduced thickness and constructed with a vertical upwardly opening slot and one of the jaws having an aperture therethrough opposite said slotted extremity of the stem.

3. The combination with a trolley harp having at its base between, and in separation from, its jaws an upstanding member of a contact spring having its lower extremity in sidewise bearing against said upstanding member, means for confining said spring against said member,—one jaw of the harp having an aperture therethrough opposite said members for access to the spring confining means.

4. The combination with a trolley harp having at its base between, and in separation from, its jaws an upstanding member provided with an upwardly opening slot, and having an aperture through one of its jaws just above its base, of a pair of contact springs, a stud having an engagement with the lower extremity of one of the contact springs and extended transversely therefrom loosely through an aperture which is in the extremity of the other contact spring and having its end portion screw threaded, said stud engaging through the said slot with the spring extremities adjacent opposite sides of said upstanding member, and a nut screw engaging on the threaded end portion of the stud, accessible through said aperture and operative to establish a clamping bind of the contact springs against and at opposite sides of the upstanding member.

5. The combination with a trolley harp having at its base between, and in separation from, its jaws, an upstanding member provided with an upwardly opening slot and said jaws having openings therethrough, opposite said upstanding slotted member, of a pair of contact springs having apertures in their lower extremities, a headed bolt, the shank of which engages through the apertures in the springs and provided outside one of the springs with a clamping nut, the shank of said bolt having a disposition within the slot of said upstanding member.

Signed by me at Springfield, Mass., in presence of two subscribing witnesses.

LEWIS J. TETLOW.

Witnesses:
WM. S. BELLOWS,
G. R. DRISCOLL.